(12) United States Patent
Fujishima et al.

(10) Patent No.: US 9,513,116 B2
(45) Date of Patent: *Dec. 6, 2016

(54) TREAD THICKNESS MEASURING METHOD

(71) Applicant: BRIDGESTONE CORPORATION, Tokyo (JP)

(72) Inventors: Takayuki Fujishima, Kodaira (JP); Ryuji Nawata, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 165 days.

This patent is subject to a terminal disclaimer.

(21) Appl. No.: 14/365,844

(22) PCT Filed: Dec. 14, 2012

(86) PCT No.: PCT/JP2012/082538
§ 371 (c)(1),
(2) Date: Jun. 16, 2014

(87) PCT Pub. No.: WO2013/089237
PCT Pub. Date: Jun. 20, 2013

(65) Prior Publication Data
US 2014/0352419 A1    Dec. 4, 2014

(30) Foreign Application Priority Data

Dec. 15, 2011  (JP) ................. 2011-274849

(51) Int. Cl.
*G01B 17/02* (2006.01)
*B60C 19/00* (2006.01)
*G01M 17/02* (2006.01)

(52) U.S. Cl.
CPC .............. *G01B 17/02* (2013.01); *B60C 19/00* (2013.01); *G01M 17/025* (2013.01); *B60C 2011/0033* (2013.04)

(58) Field of Classification Search
CPC ................. G01B 17/02; B60C 2011/0033
(Continued)

(56) References Cited

U.S. PATENT DOCUMENTS

| 2,524,208 | A |   | 10/1950 | Piper |   |
|---|---|---|---|---|---|
| 3,850,027 | A | * | 11/1974 | Nakanishi | G01N 29/223 73/105 |
| 9,329,032 | B2 | * | 5/2016 | Oda | G01B 17/02 |

FOREIGN PATENT DOCUMENTS

| CN | 2517732 Y | 10/2002 |
|---|---|---|
| GB | 907012 A | 9/1962 |

(Continued)

OTHER PUBLICATIONS

Jul. 7, 2015 Office Action issued in Japanese Application No. 2011-274849.

(Continued)

*Primary Examiner* — John Chapman, Jr.
(74) *Attorney, Agent, or Firm* — Oliff PLC

(57) ABSTRACT

The invention provides a tread thickness measuring method for accurately measuring the tread thickness from a belt surface located in an outermost position in a tire to the tread surface by an ultrasonic measurement irrespective of the material of the belt. The method includes the steps of spraying the same liquid as the liquid pooled in a tank on the tread surface of the tire under inspection before immersing the tread surface in the liquid in the tank and measuring the depth of the belt located in the outermost position in the tire by emitting ultrasonic waves to the tread surface immersed in the liquid in the tank and receiving the reflected waves.

4 Claims, 12 Drawing Sheets

(58) Field of Classification Search
USPC .......................................................... 73/627
See application file for complete search history.

(56) References Cited

FOREIGN PATENT DOCUMENTS

| | | |
|---|---|---|
| GB | 1 426 954 A | 3/1976 |
| JP | A-5-18731 | 1/1993 |
| JP | A-2000-343915 | 12/2000 |
| JP | A-2002-22715 | 1/2002 |
| JP | A-2002-86586 | 3/2002 |
| JP | A-2003-240529 | 8/2003 |

OTHER PUBLICATIONS

May 11, 2015 Search Report issued in European Patent Application No. 12857372.2.
International Search Report issued in International Patent Application No. PCT/JP2012/082538 mailed Feb. 26, 2013.
International Preliminary Report on Patentability issued in International Patent Application No. PCT/JP2012/082538 mailed Jun. 17, 2014.
Jul. 20, 2016 Office Action issued in Chinese Patent Application No. 201280064050.5.

* cited by examiner

TREAD THICKNESS MEASURING METHOD

BACKGROUND OF THE INVENTION

1. Field of the Invention

The present invention relates to a tread thickness measuring method and, in particular, to a method of measuring the tread thickness from the belt surface located in a radially outer position within a tire to the tread surface.

2. Description of the Related Art

In a conventional method of retreading a used tire, a worn tread of the tire is abraded by buffing into a predetermined shape, thus forming a bonding surface to which a new tread is bonded. Then, through certain processes, the new tread is bonded to the bonding surface. To form the bonding surface, it is necessary to first determine the thickness of tread to be removed. So a measurement is taken of the tread thickness from the tread surface to the outermost belt located in a radially outermost position of the belt layer which is one of the structural members of a tire. The tread thickness is measured using a non-contact eddy-current sensor, for instance. The eddy-current sensor has a detection coil therein. When a magnetic flux is induced with a high-frequency current passed through the detection coil, an eddy current is creased in the belt layer by the induced magnetic flux. This will cause a change in the magnetic flux in the detection coil. And by detecting the change in impedance occurring in the detection coil, the thickness from the tread surface to the outermost belt surface is measured.

PRIOR ART DOCUMENT

Patent Document

Patent Document 1: Japanese Unexamined Patent Application Publication No. 2002-86386

SUMMARY OF THE INVENTION

Problem to be Solved by the Invention

However, the eddy-current, sensor needs to create an eddy current in the belt in order to measure the tread thickness. As such, if the belts used in a tire are not steel belts made of steel cords, then the eddy-current sensor will be useless in measuring the tread thickness. That is, if the belts are fiber belts made of fiber cords of organic fiber or other non-metallic material, then, without the induction, of a magnetic flux in the belt, it will be impossible to measure the distance from the tread surface to the outermost belt. Thus, when the belts used in the tire are fiber belts, the worker needs to drill small holes at a plurality of circumferential and axial positions of the tire from the tread surface until the surface of the outermost belt is exposed. Then the worker measures the depth from the tread surface to the outermost belt surface by applying a depth gauge and determines the depth for buffing operation. This will increase the man-hours for buffing and decrease the work efficiency of tire retreading.

Also, there are cases where the tires employ a fiber belt only for the outermost belt of the belt layer. Retreading such tires is done by first measuring with an eddy-current sensor the depth to the surface of the belt made of steel cords. Then the fiber belt, together with the tread, is abraded by buffing, and a new fiber belt, replacing the fiber belt removed by buffing, is incorporated into the tread to be applied afresh. However, in the fabrication of a tread to be newly bonded to the bonding surface, the tread incorporating the fiber belt entails an increased cost in manufacturing and even raises the retreading cost as a whole.

For example, in detecting the fiber belt made of fiber cords, a method may be used to measure the tread thickness by an ultrasonic measurement known as a non-destructive inspection technique. To detect the belt by the use of ultrasonic waves, it is necessary to emit ultrasonic waves to the belt and receive the reflected waves from the belt with precision. To do so, an ultrasound probe, which is designed for ultrasonic measurement, may have to be moved in contact with the tread surface in the width and circumferential directions of the tire. Yet the unevenness of the tread surface, such as the tire grooves, does not allow the ultrasound probe to be traced along the surface unevenness. As a way conceivable to solve this problem, ultrasonic waves may be emitted from the ultrasound probe to the tread surface through a medium that can propagate ultrasonic waves. There may be various materials usable as medium that can propagate ultrasonic waves. However, since measuring the tread thickness is one of the processes of retreading, water, which does not adversely affect the tire, may be selectable as the medium to be used.

However, if a tire is immersed in water, countless air bubbles may adhere to the surface of the tire dues to the relationship between the properties of tire material and the properties of water. When air bubbles are adhering to the tread surface, in particular, of the tire surface, the ultrasonic waves, even if emitted, may not propagate through the air bubbles. And this may not contribute to accurate measurement of the belt position.

As a solution to the aforementioned problems, the present invention aims to provide a tread thickness measuring method capable of ultrasonically measuring the tread thickness from the belt surface in an outermost position within a tire to the tread surface with accuracy irrespective of the type of belt material.

Means for Solving the Problem

In solving the above-described problems, a tread thickness measuring method in one aspect of the present invention includes the steps of spraying the same liquid as the liquid pooled in a tank on the tread surface before immersing the tread surface of the tire under inspection in the liquid in the tank and measuring the depth of the belt located in an outermost position in the tire by emitting ultrasonic waves to the tread surface immersed in the liquid in the tank and receiving the reflected waves.

The invention will now be described in detail based on preferred embodiments which do not intend to limit the scope of the claims of the present invention but exemplify the invention. All of the features and the combinations thereof described in the embodiments are not necessarily essential to the invention, and constructions and arrangements to be employed selectively are included in the invention.

BEST MODE FOR CARRYING OUT THE INVENTION

Figure 1:
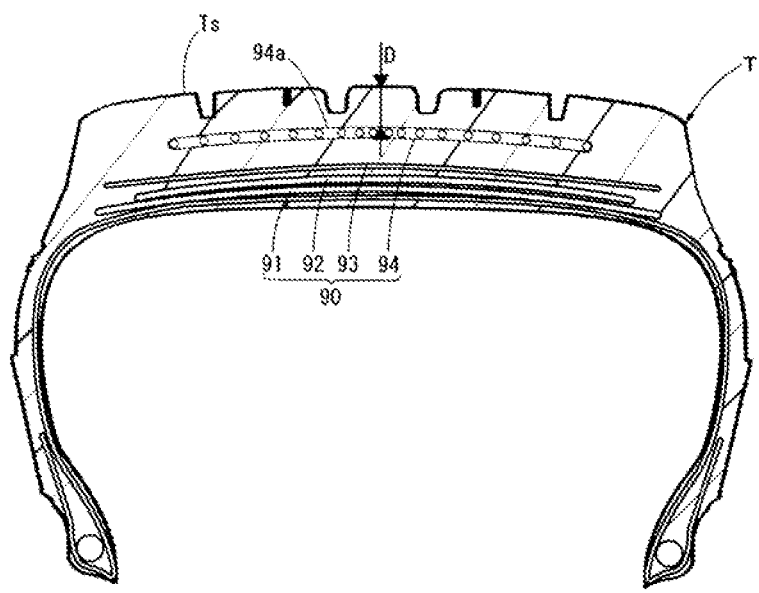
FIG. 1 is a cross-sectional view of a tire.
Figure 2:
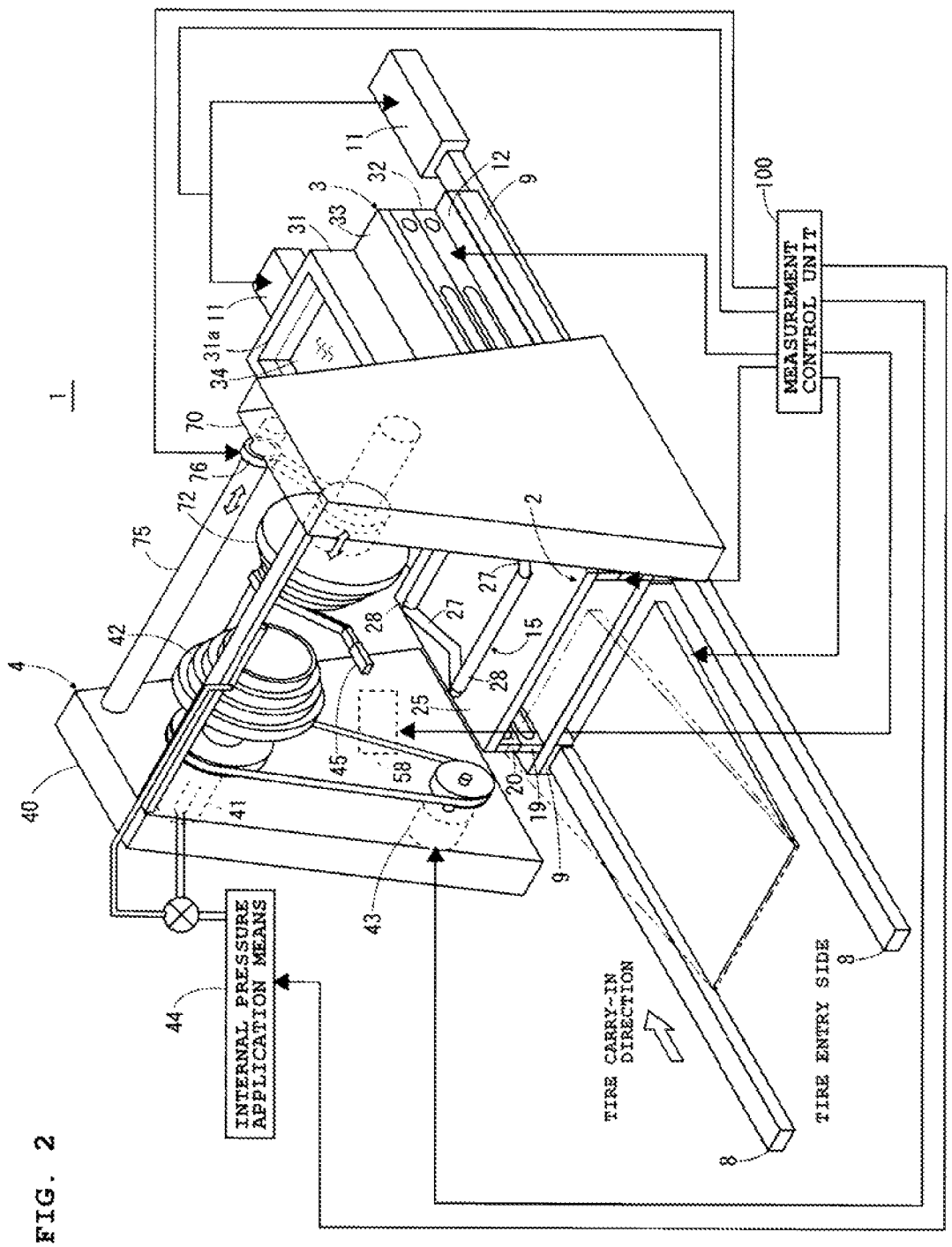
FIG. 2 is a structural illustration of a tread thickness measuring apparatus in accordance with the present invention.

FIG. 1 is a cross-sectional view of a tire T which is a sample under inspection. FIG. 2 is a structural illustration of a tread thickness measuring apparatus 1.

A description is first given of the structure of a tire T of which the tread thickness D is measured with a tread thickness measuring apparatus 1 according to the present invention. The tire T, which is a sample under inspection, is a used tire, for instance. And, as shown in FIG. 1, the tire T has a belt layer 90, consisting of a plurality of belts 91 to 94, in the tread region. The belt layer 90 is constituted by the belts 91 to 93, which are located in radially inner positions of the tire, and the belt 94, which is located in a radially outermost position of the tire. The belts 91 to 93 are steel belts made of steel cords, whereas the belt 94 is a fiber belt made of non-metallic fiber cords. The tread thickness D according to the present embodiment is the distance from the tread surface Ts to the belt surface 94a of the belt 94 located in the outermost position of the belt layer 90.

Hereinbelow, a description is given of a tread thickness measuring apparatus 1 with reference to FIG. 2.

The tread thickness measuring apparatus 1 is constructed of a tire lifting and lowering unit 2, which lifts and lowers the tire T for tread thickness measurement, a tank lifting and lowering unit 3, which lifts and lowers a tank 31 used in the measurement of the tread thickness D of the tire T, and a tire holding unit 4, which holds the tire T for tread thickness measurement.

The tire lifting and lowering unit 2 and the tank lifting and lowering unit 3 are placed on a pair of rails 8, 8 laid on the floor a predetermined distance apart from each other. Each rail 8 is provided with a slider 9 which moves along its extension direction, and the rail 8, together with the slider 9, constitutes a linear guide. The rails 8, 8 incorporate each a not-shown ball screw mechanism which has a ball screw along the extension direction of the rail 8 and a ball nut threadably mounted on the ball screw. The ball nut, which is secured to the slider 9, moves the slider 9 along the rail 6 as the ball screw rotates. Attached to one end of each ball screw is a servo motor 11, which is a drive means for the slider 9. The servo motors 11, 11, which are each connected to a measurement control unit 100 to be discussed later, perform the drive synchronously according to the signals from the a measurement control unit 100.

h flat and rectangular base plate 12 is installed on the sliders 3, 9, and the tire lifting and lowering unit 2 and the tank lifting and lowering unit 3 are installed on the base plate 12. More specifically, the tire lifting and lowering unit 2 is located on the side where the tire T is carried in, and the tank lifting and lowering unit 3 on the side downstream of tire entry.

Figure 3:
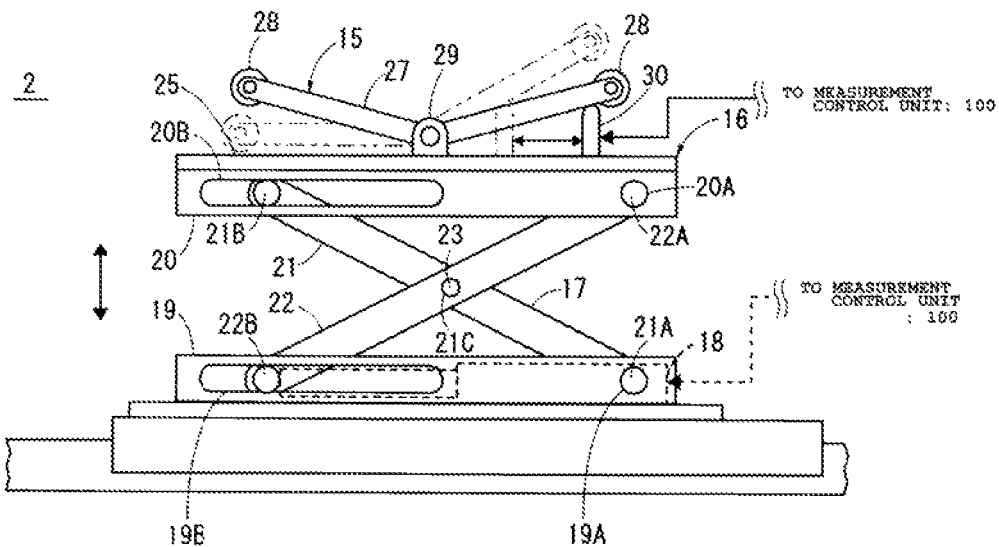
FIG. 3 is a structural diagram of a tire lifting and lowering unit.

FIG. 3 is a structural diagram of a tire lifting and lowering unit 2.

The tire lifting and lowering unit 2 includes a tire mounting unit 15 for mounting the tire T for tread thickness measurement and a tire lifting and lowering mechanism 16 for lifting and lowering the tire mounted on the tire mounting unit 15.

The tire lifting and lowering mechanism 16 includes a pair of X-shaped links 17 and a hydraulic cylinder 18 which controls the cross angle of the X-shaped links 17. The X-shaped links 17 are each constructed of a lower guide member 19 and an upper guide member 20, which guide the link operation, and a pair of link members 21 ans 22. The lower guide member 19 and the upper guide member 20 are each constituted by a member having an "I" cross section. The lower guide member 19 and the upper guide member 20 have circular holes 19A and 20A, respectively, on one end side thereof and elongate holes 19B and 20B, respectively, extending from the other end side toward the one end side thereof. The link members 21 ans 22, which are each an elongate plate member, have center holes 21C at the center of the length thereof, shafts 21A and 22A, respectively, on one end side thereof, and wheels 21B and 22B, respectively, of the size rotatable along the elongate holes 19B and 20B on the other end side thereof. A pair of the link members 21 and 22 are held turnably on each other with the wheels 21B and 22B facing the same direction and a shaft member, such as a bolt, penetrating through the center holes 21C aligned with each other.

And, of the pair of the link members 21 and 22, one link member 21 is turnably secured to the lower guide member 19 by fitting the shaft 21A of the one link member 21 into the circular hole 19A of the lower guide member 19, and the other link member 22 is held movably along the elongate hole 19B by placing the wheel 22B of the other link member 22 into the elongate hole 19B of the lower guide member 19.

Also, the other link member 22 is turnably secured to the upper guide member 20 by fitting the shaft 22A of the other link member 22 into the circular hole 20A of the upper guide member 19, and the one link member 21 is held movably along the elongate hole 20B by placing the wheel 21B of the one link member 21 into the elongate hole 20B of the upper guide member 20.

The X-shaped links 17 of the structure as described above are placed on the base plate 12 a predetermined distance apart from each other on the right and left as seen in the tire carry-in direction. The lower guide member 19 is anchored to the base plate 12 by not-shown securing means such as bolts. Also, the right and left X-shaped links 17, 17 are of such design that the lower end portions of the link members 21 and 22 are linked with each other by not-shown coupling rods and the link members 21 and 22 move in synchronism with each other by the agency of the coupling rods. Secured to the coupling rods is one end of the hydraulic cylinder 18, which is the drive source of the lifting and lowering mechanism. The hydraulic cylinder 18 is located between the X-shaped links 17, 17 on the right and left of the top surface 12a of the base plate, and the other end thereof is secured to the base plate 12. A mounting plate 25 for mounting a tire T is placed on the upper guide members 20, 20 of the right and left X-shaped links 17, 17.

The mounting plate 25 is a flat plate having a sufficient strength to support the weight of the tire T, which is a sample under inspection, and the tire mounting unit 15 is installed on the top surface thereof. On the top surface of the mounting plate 25, supports 29, 29 for supporting the tire mounting unit 15 are placed at a predetermined distance from each other on the right and left sides as seen in the tire entry direction.

The tire mounting unit 15 is constructed of a pair of support-plates 27, 27 and a pair of rollers 28, 28 supported by the pair of support plates 27, 27.

The support plate 27, which is a flat plate formed into a V shape, is installed with its extension direction along the tire carry-in direction. The support plate 27 is turnably attached to the supports 29, 29 of the mounting plate 25 at the center of its length such that one top portions of the V shape can face toward the mount rug plate 25. The roller 28 is sandwiched between a pair of support plates 27, 27 and rotatably supported by a shaft penetrating the support plates 27, 27 at each end thereof.

Disposed on the underside of one side of the support plate 27 is a slider 30 which can move along the length direction of the support plate 27 by the operation of a not-shown moving mechanism. The slider 30, which is in contact with the lower surface of the support plate 27, controls the inclination of the tire mounting unit 15.

More specifically, when the tire T is to be mounted on the tire mounting unit 15, the slider 30 is moved toward the upstream side of the tire carry-in direction so that the tire mounting unit 15 is inclined with the roller 28 on the upstream side moving down and the roller 28 on the downstream side moving up. Then, with the tire T placed on the fire mounting unit 15, the slider 30 is moved toward the downstream side of the tire carry-in direction to hold the tire mounting unit 15 horizontal. Also, when the tire T is to be carried out, the slider 30 is moved toward the upstream side of the tire carry-in direction so that the tire mounting unit 15 is inclined toward the upstream side of the tire carry-in direction.

With the tire mounting unit 15 inclined this way, it is possible to carry a tire T, which can be quite heavy, easily onto or out of the tire mounting unit 15. Also, with the tire T mounted on the tire mounting unit 15 lifted and lowered by the tire lifting and lowering unit 2, it is possible to lift and lower the tire T, which may be light or heavy, to and from the tire holding position of the tire holding unit 4 to be discussed later without the help of the worker.

Figure 4:
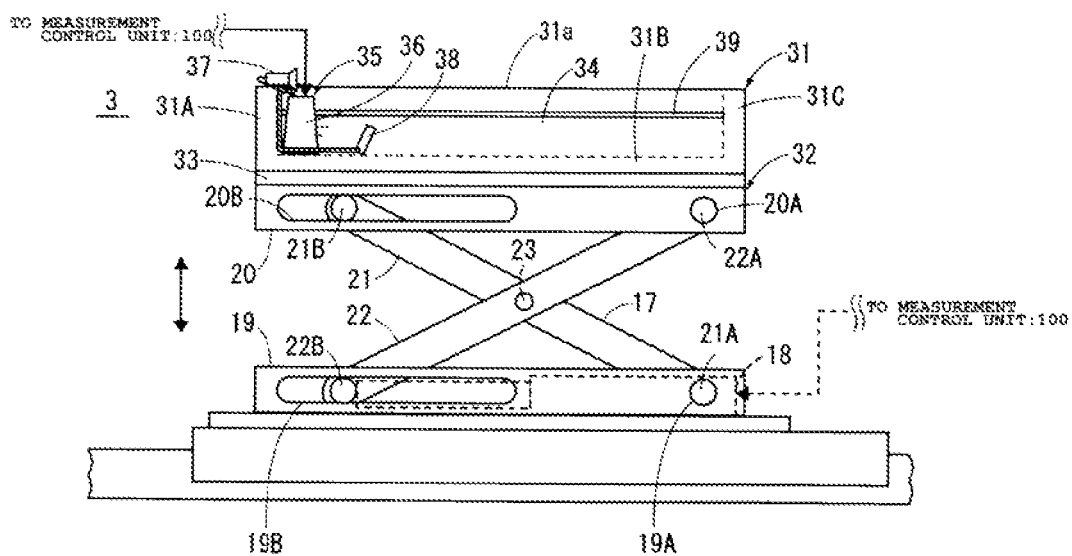
FIG. 4 is a structural diagram of a tank lifting and lowering unit.

FIG. 4 is a structural diagram of a tank lifting and lowering unit 3.

The tank lifting and lowering unit 3 includes a tank lifting and lowering mechanism 32 for lifting and lowering a tank 31. Note that the structure of the tank lifting and lowering mechanism 32 is the same as that of the tire lifting and lowering mechanism 16 and the description thereof will be omitted. The tank 31 is secured onto the mounting plate 33 of the tank lifting and lowering mechanism 32.

Figure 5:
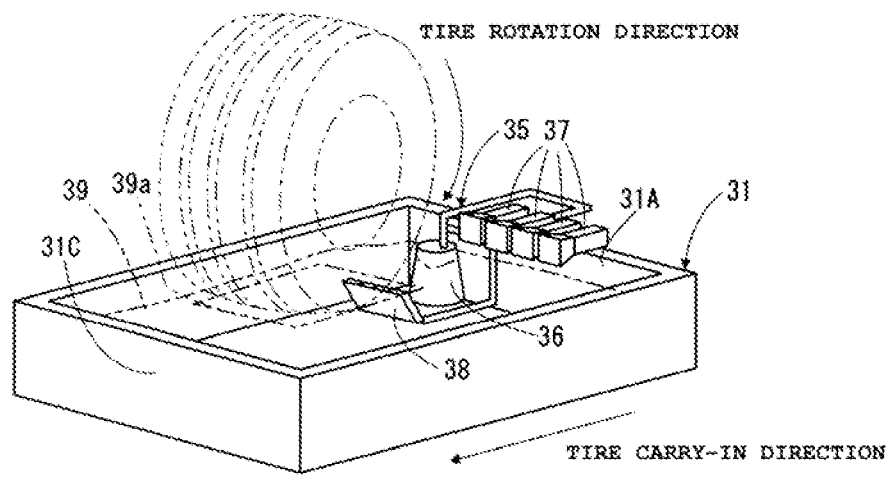
FIG. 5 is a schematic structural illustration of a tank.
Figure 6:
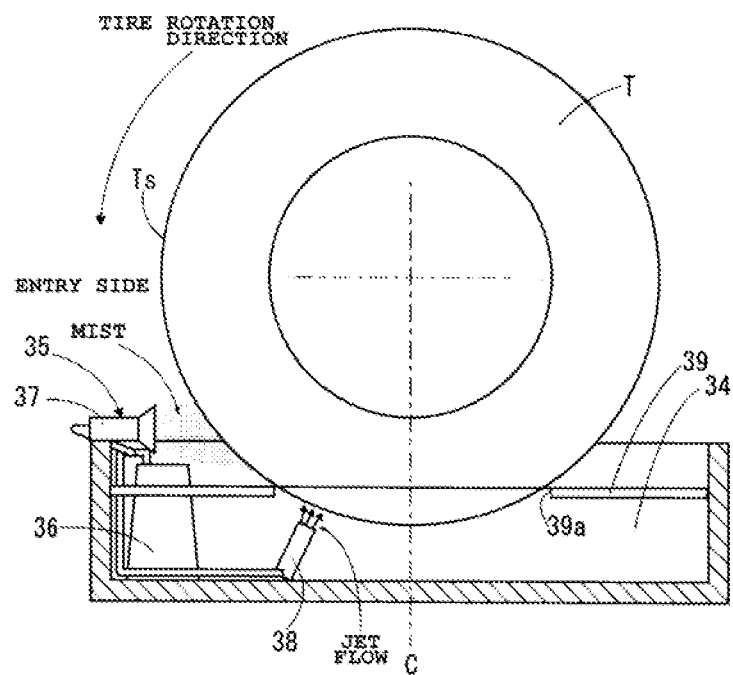
FIG. 6 is a side elevation of a tank.

FIG. 5 is a schematic structural illustration of the tank 31. FIG. 6 is a side elevation of the tank 31.

The tank 31 has a space for pooling a liquid 34, an air bubble removing unit 35 for removing air bubbles adhering to the tread surface Ts immersed in the liquid 34, and an air bubble suppressing means 39 for suppressing the occurrence of air bubbles due to the waving of the surface of the liquid 34 pooled therein.

The tank 31, which is a box opening at the top, pools the liquid 34 inside and has an opening 31a large enough to allow the tread surface Ts of the tire T for tread thickness measurement to be immersed in the liquid 34 (see FIG. 4). The liquid 34 to be pooled in the tank 31 is water, for instance. Note that the liquid 34 is not limited to water, and any liquid medium may be used so long as it can propagate ultrasonic waves. Also, it is to be noted that the tank 31 may be shaped otherwise with a triangular/V or arcing shape of the bottom 31B. That is, the amount of the liquid 34 pooled in the tank 31 may be reduced by forming the tank 31 in a shape along the curvature of the tire.

The air bubble removing unit 35 is comprised of a pump 36 for pumping up the liquid 34 pooled in the tank 31, a spray nozzle 37 as a spray means for spraying a mist of the liquid 34 pumped up by the pump 36 on the tread surface Ts, and a jet nozzle 38 as a liquid ejecting means for ejecting a jet flow of the liquid 34 to the tread surface Ts immersed in the liquid 34.

The pump 36, which, is, for example, a submersible pump to be used in a sunken state in the liquid 34 pooled in the tank 31, is secured to the bottom, surface of the bottom 31B of the tank 31 by a not-shown securing means. The liquid 34 pumped up by the pump 36 is sent out to the spray nozzle 37 and the jet nozzle 38.

The spray nozzle 37, which is secured to the tank 31, is disposed on the upstream side of the point where the tire T rotating in one direction enters the liquid 34. In the present embodiment, the tire T held by the tire holding unit 4 rotates in the direction indicated by the arrow in FIG. 5. The spray nozzle 37 is installed on a wall section 31A which is located on the downstream side in the tire carry-in direction of the tank 31. More specifically, a plurality of spray nozzles 37 are arranged along the edge of the wall section 31A on the upstream side of the point where the tire T enters the liquid 34 with the discharge outlets thereof facing toward a wall section 31C which is on the opposite side of the wall section 31A. It is to be noted that the number of the spray nozzles 37 may be chosen and arranged as appropriate to meet the spray range for the liquid 34 to be sprayed. And those spray nozzles 37 should be disposed such that the spray can cover at least the whole width range of the tread surface Ts. Connected to the spray nozzles 37 is a piping led from the pump 36, and a mist of the liquid 34 is sprayed from a plurality of spray holes formed in each of the spray nozzles 37 under the pressure created by the operation of the pump 36. Although the state of the liquid 34 sprayed from the spray nozzles 37 is not limited to a misty state, the spray in a misty state is preferable so that the liquid 34, as it attaches itself to the tread surface Ts, does not easily flow over the tread surface Ts. Once it attaches itself to the tread surface Ts, the misty liquid 34 binds together to form a thin film of the liquid 34 over the tread surface Ts. As a result, when the tread surface Ts enters the liquid 34 pooled in the tank 31, the liquid 34 formed in a film over the tread surface Ts easily joins with the liquid 34 pooled in the tank 31. This will markedly reduce the adhesion of air bubbles to the tread surface Ts.

The jet nozzle 38 is secured by a not-shown securing means to the bottom 31B of the tank 31 on the wall section 31A side of the center C thereof and is therefore fully submerged in the liquid 34 pooled in the tank 31. The jet nozzle 33 is secured to the bottom 31B of the tank 31 in such a manner that the discharge cutlet is oriented in the direction of the surface of the liquid 34. Connected to the jet nozzle 33 is a piping led from the pump 36, and a pressurized liquid current is ejected from the discharge outlet of the jet nozzle 33 under the pressure created by the operation, of the pump 36.

That is, the air bubbles having adhered to the tread surface Ts at its entry in the liquid are washed away by the jet of the liquid discharged from the jet nozzle 38 against the tread surface Ts immersed in the tank 31. This can assure the performance with accuracy of an ultrasonic measurement to be conducted in a subsequent process.

The pump 36, which is connected to the measurement control unit 100, operates in response to the signals outputted from the measurement control unit 100. It is to be noted here that the spray of liquid 34 from the spray nozzles 37 and the jet flow of liquid from the jet nozzle 38 have been described as occurring by the operation of the pump 36. However, the arrangement may be such that the spray nozzles 37 and the jet nozzle 33 are operated individually by their respective valves along with the operation of the pump 36.

The air bubble suppressing means 39 is a sheet member floatable on the surface of the liquid 34. The air bubble suppressing means 39, which is of approximately the same shape and dimensions as the opening of the tank 31, has near the middle thereof an opening 39a of a size large enough to allow the tread surface Ts of the tire T to be immersed in the liquid 34. With the air bubble suppressing means 39 floating on the surface of the liquid 34, the waving of the liquid surface is controlled, thus suppressing the occurrence of air bubbles due to waving near the tread surface Ts. Note that the air bubble suppressing means 39 may also be an object like a robber ball which is floatable on the surface of the liquid 34.

Also, it should be noted that the opening 39a in toe air bubble suppressing means 39 must be formed in a size that allows the entry and measuring motion in the tire width direction of the probe support arm 62 of the thickness measuring unit 45 to which the ultrasound probe 59 is attached.

Figure 7:
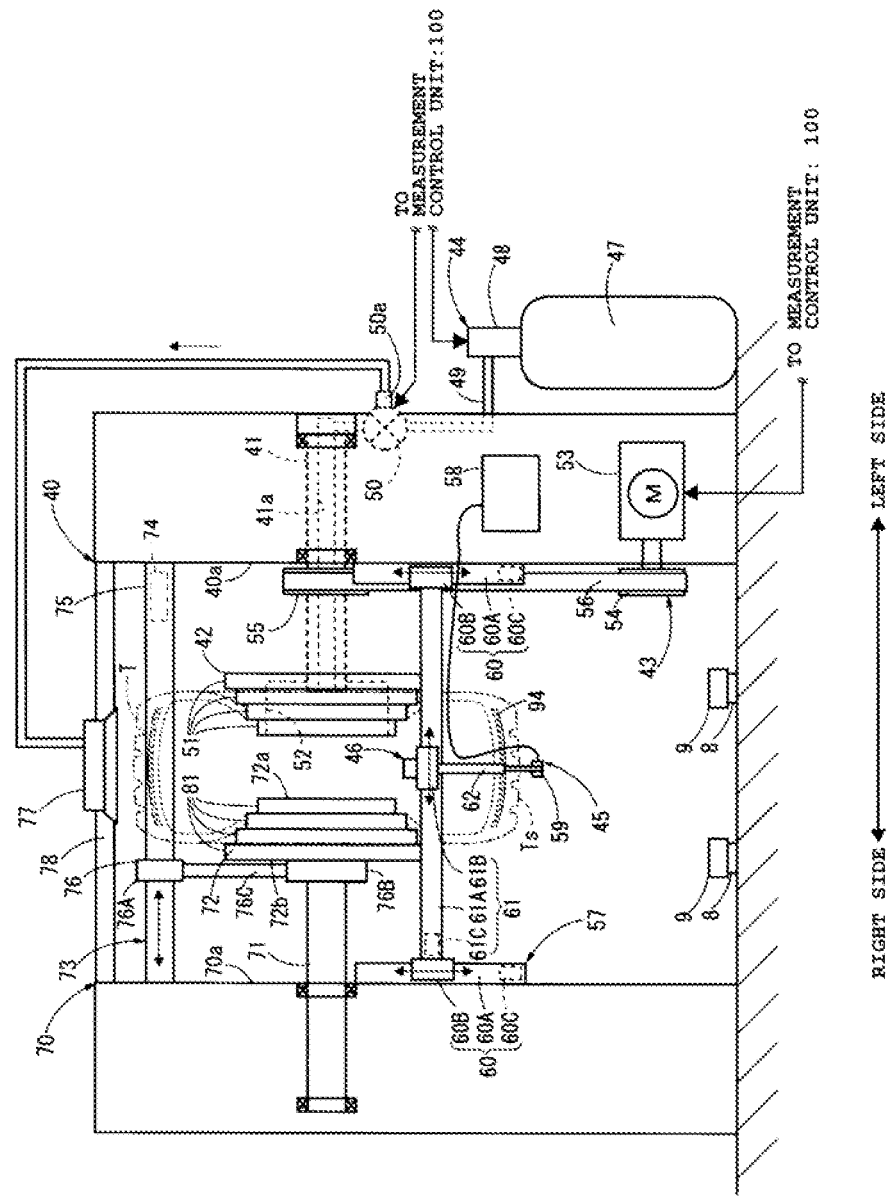
FIG. 7 is a rear elevation of a tire holding unit.

FIG. 7 is a rear elevation of a tire holding unit 4.

The tire holding unit 4 is located at the position where the tire lifting and lowering unit 2 lifts and lowers the tire T. More specifically, the tire holding unit 4 is located astride the rail 8, 8 along which the tire lifting and lowering unit 2 and the tank lifting and lowering unit 3 move.

The tire holding unit 4 includes left and right bodies 40 and 70, which are located with the rails 8, 8 in between, a pair of left and right rim bodies 42 and 72, which are provided on the left and right bodies 40 and 70, respectively, to hold the tire T, an internal pressure application means 44 for applying internal pressure to the tire T held by the left and right rim bodies 42 and 72, a shape measuring means 46 for measuring the external shape, or profile, of the tread surface Ts of the tire T with the internal pressure applied, a thickness measuring unit 45 for measuring the tread thickness D from the tread surface Ts to the belt 94 of the tire T, and a tire drying means 77.

Hereinbelow, a description is given of the tire holding unit 4 by referring to the left body 40 and the right body 70 in this order.

The left body 40 includes a left main spindle 41 extending in a direction orthogonal to the extension direction of the rails 8, 8, a left rim body 42 attached to one end of the left main spindle 41 for supporting the tire T, a tire rotating means 43 for rotating the tire T, and an internal pressure application means 44 for applying internal pressure to the tire T held by the rim bodies 42 and 72.

The left main spindle 41, which is a hollow cylinder in shape, extends in a direction orthogonal to the extension direction of the rails 8 above the tire lifting and lowering unit 2. The left main spindle 41 has one end thereof rotatably supported by a bearing or the like within the left body 40 and the other end thereof projecting from one side of the left body 40 toward the right, body 70. The one end of the left main spindle 41 is connected to the internal pressure application means 44.

The internal pressure application means 44 includes a compressor 47, a pressure control valve 43 attached to the discharge opening of the compressor 47, a piping 49 connecting the pressure control valve 48 to the one end of the left main spindle 41, and an air release valve 50 provided at a midway point of the piping 49 to release the air pressure applied in the tire T. The compressor 47 always accumulates pressure higher than the internal pressure to be supplied to the tire T. The pressure control valve 48, which is attached to the discharge opening or the compressor 47, controls the air accumulated, in the compressor 47 at a predetermined pressure level. More specifically, the pressure control valve 48, which is connected to the measurement control unit 100, controls the air pressure discharged in response to the signal outputted from the measurement control unit 100 and stops the discharge of the air when, the air pressure inside the tire becomes equal to the air pressure discharged. The piping 43, which connects the control, valve 48 to the one end of the left main spindle 41, supplies the air discharged from the compressor 47 to the through hole 41a of the left main spindle 41 by way of the control valve 48. The air release valve 50, which is provided with an air release outlet 50a, opens the valve in response to the signal outputted from the measurement control unit 100 and releases the air in the tire T through the air release outlet 50a. Connected to the air release outlet 50a is one end of a piping communicating between the air release valve 50 and the tire drying means 77 to be discussed later. It is to be noted that the air release outlet 50a of the air release valve 50 remains closed when there is no input of a signal.

The left rim body 42 is formed in a truncated cone shape having a stepped periphery 51 with a plurality of steps. The stepped periphery 51 is formed with steps of diameters corresponding to the different inner diameters of tires. The stepped periphery 51, which performs the function of a bead seat on a wheel, is formed with concentric steps on the left rim body 42. Also, the left rim body 42 has a hollow portion 52 in the middle. The hollow portion 52 is formed as a cylindrical recess from the smaller diameter face toward the larger diameter face of the left rim body 42 and is communicated with the through hole 41a of the left main spindle 41. Therefore, the air sent from the compressor 47 through the control valve 48, the piping 49, and the through hole 41a of the left main spindle 41 is discharged into the hollow portion 52 of the left rim body 42.

The tire rotating means 43 includes a motor 53 secured to the left body 40, a drive pulley 54 attached to the motor 53, spindle-side pulley 55 secured to the left main spindle 41, and a belt 56 set on the spindle-side pulley 55 and the drive pulley 54.

The motor 53 is secured within the left body 40 in such a manner that the rotating shaft of the motor 53 projects from one side of the left body 40. The drive pulley 54, which is of a diameter smaller than that of the spindle-side pulley 55, is attached to the rotating shaft of the motor 53 projecting from the left body 40. The spindle-side pulley 55 is provided between the left rim body 42 attached to the left main shaft 41 and the left body 40. The belt 56, which is set on the drive pulley 54 and the spindle-side pulley 55, rotates the left main spindle 41 by conveying the rotative force of the motor 53 to the spindle-side pulley 55 via the drive pulley 54. The motor 53, which is connected to the measurement control unit 100, performs a drive according to the signals outputted from the measurement control unit 100.

The right body 70, located on the side opposite to the left body 40 with the rails 8, 8 in between, includes a right main spindle 71 corresponding to the left main spindle 41, a right rim body 72 corresponding to the left rim body 42, and a rim body moving means 73 for moving the right rim body 72 closer to or apart from the left rim body 42.

The right main spindle 71, which is provided in the right body 70 coaxially with the left main spindle 41, has one end thereof rotatably supported by a bearing or the like within the right body 70 and the other end thereof projecting from one side of the right body 70 toward the left body 40.

The right rim body 72, which is formed in a truncated cone shape in the same way as with the left rim body 42, is attached coaxially to the right main spindle 71. The right rim body 72 has a stepped periphery 81 with a plurality of steps corresponding to the stepped periphery 51 with a plurality of steps of the left rim body 42. The stepped periphery 31 is formed with the same dimensions and shapes as those of the stepped periphery 51 of the left rim body 42. Unlike the left rim body 42, the right rim body 72 is formed without a hollow portion. Now the left rim body 42 and the right rim body 72 are brought closer to each other to hold the tire T by the bead portions thereof in close contact with one of the steps of the stepped peripheries 51 and 81 of the left rim body 42 and the right rim body 72. And an internal pressure is applied to the tire 1 as the air supplied to the hollow portion 52 of the left rim body 42 is filled in the space closed by the peripheral surface of the left rim body 42, the infernal peripheral surface of the tire, and the peripheral surface and the smaller diameter face 72a of the tight rim body 72.

The rim body moving means 73 includes a bridge member 75 placed between the left body 40 and right body 70 in a position near the top end thereof and a moving member 76 capable of moving along the bridge member 75. The bridge member 75, which may be a cylindrical shaft, bridges between the left body 40 and the right body 70 in a position near the top end thereof. The bridge member 75 has a not-shown built-in drive mechanism capable of moving the moving member 76 along the axis thereof. The drive mechanism may, for instance, be constructed of a ball screw mechanism and a servo motor 74. Thus the ball nut may be moved as the servo motor 74 drives the ball screw of the ball screw mechanism. The servo motor 74, which is connected to the measurement control unit 100, operates in response to the signals outputted from the measurement control unit 100. The moving member 76 is constructed of a smaller ring part 76A, a larger ring part 75B secured to the larger diameter face 72b of the right rim body 72 and moving along the axis of the right main spindle 71, and a connecting member 76C connecting the smaller ring part 76A and the larger ring part 76B. The smaller ring part 76A is secured to the ball nut of the ball screw mechanism, which is the drive mechanism, whereas the larger ring part 76B is secured to the larger diameter face 72b of the right rim body 72. Thus, the tire T can be held or released as the right rim body 72 and the left rim body 42 are brought closer to or apart from each other by the drive of the servo motor 74 which moves the moving member 76 along the axis of the bridge member 75.

The thickness measuring unit 45 is roughly comprised of a positioning means 57 for shifting the measurement position, an ultrasonic oscillator 58, and an ultrasound probe 59.

The positioning means 57 includes a vertical-direction positioning mechanism 60 and a width-direction positioning mechanism 61 attached to the vertical-direction positioning mechanism 60. The vertical-direction positioning mechanism 60 is constituted by a pair of linear guides, for instance, and the linear guides are placed on the left body 40 and the right body 70, respectively. More specifically, one linear guide and the other linear guide are installed in such a manner as to face each other on the wall faces 40a and 70a, respectively, of the left body 40 and the right body 70 facing each other. The linear guides are each provided with a rail 60A, a slider 60B moving along the rail 60A, and a servo motor 60C serving as the drive source of the slider 60B. The linear guides are secured to the respective wall faces 40a and 70a such that the extension direction of the rails 60A, 60A is the vertical direction and are placed on the rails 60A, 60A such that the sliders 60B, 60B face each other with the lines connecting the sliders 60B, 60B held horizontal. The servo motors 60C are driven synchronously in response to the signals outputted from the measurement control unit 100 to be discussed later, thereby moving the sliders 60B vertically up and down along the rails 60A.

The width-direction positioning mechanism 61 is secured in such a manner as to bridge between the sliders 60B, 60B of the vertical-direction positioning mechanism 60. The width-direction positioning mechanism 61 employs a linear guide as with the vertical-direction positioning mechanism 60, and a rail 61A, which constitutes the linear guide, is secured to the sliders 60B, 60B. The linear guide is provided with a servo motor 61C which serves as the drive source for the slider SIB moving on the rail 61A. The servo motor 61C is driven in response to the signals outputted from the measurement control unit 100 to be discussed later, thereby moving the slider 61B along the rail 61A in the tire width direction.

Secured to the slider 61B of the width-direction positioning mechanism 61 are a probe support arm 62 to which the ultrasound probe 59 is attached and a laser sensor 63 (see FIG. 8) which is the shape measuring means 46.

Figure 8A:
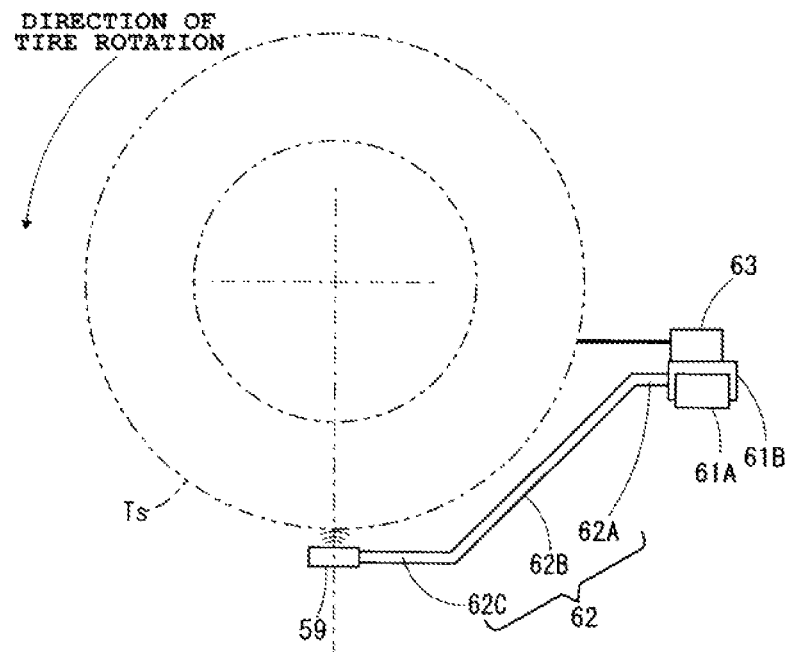
FIG. 8 is a conceptual diagram for the measurement of tread thickness and a partially enlarged view showing the measuring concept.
Figure 8B:
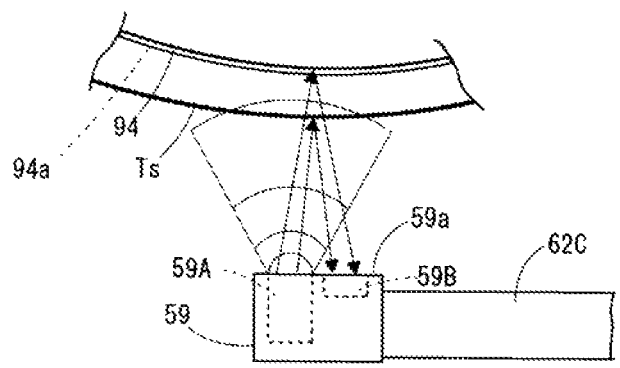

FIG. 8A is a conceptual diagram for the measurement of tread thickness using an ultrasound probe 59 and a laser sensor 63 attached to the slider 51B. And FIG. 8B is a partially enlarged view showing the measuring by the ultrasound probe 59 attached to a probe support portion 62C.

The probe support arm 62 consists of a horizontal extension portion 62A that extends horizontally from the slider SIB, a clearance portion 62B that extends obliquely downward to evade interference with the tire T and the tank 31, and a probe support portion 62C that again extends horizontally. And the end of the probe support portion 62C extends closer to a position vertically below the axis connecting the left main spindle 41 and the right main spindle 71. Attached to the end of the probe support portion 62C is the ultrasound probe 59.

The ultrasound probe 59 is a non-contact probe, for instance. The ultrasound probe 59 is secured to the probe support portion 62C such that the measurement position is located vertically below the axis connecting the left main spindle 41 and the right main spindle 71 with the measuring surface 59a facing the tread surface Ts. The ultrasound probe 59, having the emitter 59A and the receiver 59B in the same plane, emits ultrasonic waves from the emitter 59A in the direction of the tread surface Ts and receives the reflected waves reflected from the tread surface Ts and other constituent members of the tire T such as the belt 94 by the receiver 59B.

Thus, the ultrasonic waves emitted from the emitter 59A of the ultrasound probe 59 can be propagated in a substantially normal direction to the tread surface Ts via the liquid 34. Hence, it is possible to direct the ultrasonic waves to the belt surface 94a with greater accuracy and receive the ultrasonic waves reflected from there by the receiver 59B. That is, the ultrasonic waves emitted vertically to the tread surface Ts are propagated through the liquid 34. And the ultrasonic waves reflected from the tread surface Ts are first received by the receiver 59B, and then the ultrasonic waves propagated into the tread are reflected from the belt surface 94a located in the radially outermost position of the belt layer and received by the receiver 59B. Thus, the thickness from the tread surface Ts to the outermost belt surface 94a located in the radially outermost position of the belt layer can be measured. The ultrasonic waves emitted by the emitter 59h are generated by the ultrasonic oscillator 58.

Referring back to FIG. 7, the ultrasonic oscillator 58, which is disposed, for instance, inside the left body 40, is connected by wiring to the ultrasound probe 59. The ultrasonic oscillator 58, which is connected to the measurement control unit 100, operates in response to the signals outputted from the measurement control unit 100. More specifically, the ultrasonic oscillator 58 has the emitter 59A of the ultrasound probe 59 emit ultrasonic waves by generating ultrasonic waves according to the signals outputted from the measurement control unit 100 and outputs the reflected waves of the ultrasonic waves received by the receiver 59B to the measurement control unit 100. The measurement of the tread thickness D is performed, for example, at a total of 3000 points, that is, 40 points in the width direction times 75 points in the circumferential direction.

The shape measuring means 46 is secured to the slider 61B in the same position as the probe support arm 62. The shape measuring means 46, which is, for instance, a laser sensor, has its direction of measurement oriented on the side where the probe support arm 62 extends and sends laser beam approximately in a horizontal direction. With the laser sensor 63 secured to the slider 61B in the same position as the probe support arm 62, it is possible to set the position for shape measurement by the laser sensor 63 and the position for ultrasonic measurement by the ultrasound probe 59 in the same position in the tire width direction. Also, the sectional shape of the tread surface Ts can be measured, by moving the laser sensor 63, together with the slider 61B, in the tire width direction while the laser beam from the laser sensor 63 is applied onto the tread surface Ts of the tire T held by the left and right rim bodies 42 and 72. It is to be noted that the sectional shape of a tire including the sectional shape of the tread surface Ts can be measured with the laser sensor 63 moved, between one tire side and the other tire side while the laser beam is applied onto the tread surface Ts. Therefore, it is possible to set the width center of the fire T and the width range of the tread surface Ts to be measured in the ultrasonic measurement.

Figure 9A:
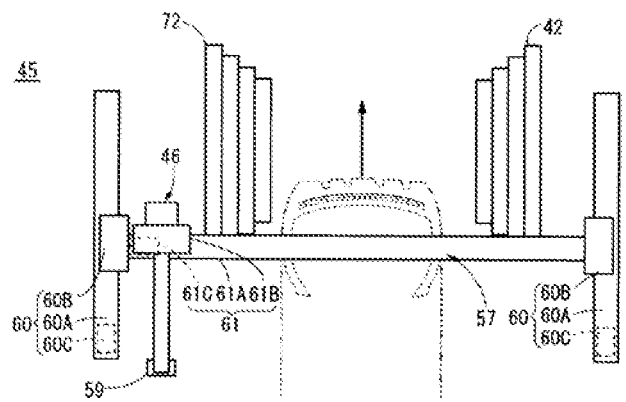
FIG. 9 is illustrations showing the operation of a tread thickness measuring apparatus.
Figure 9B:
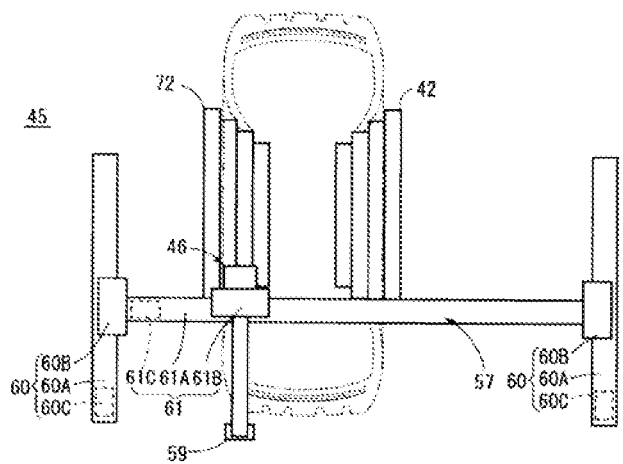
Figure 9C:
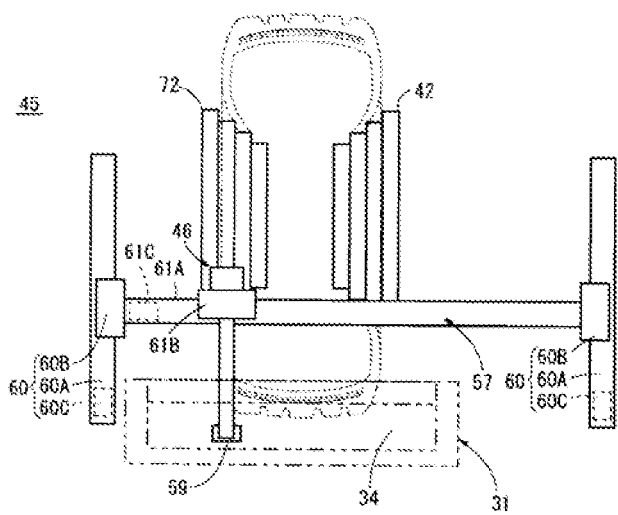

FIGS. 9A, 9B, and 9C are diagrams showing an operation of a thickness measuring unit 45.

As shown in FIG. 9A, when the measurement is not being done, like when the tire T is being held or released by the left and right rim bodies 42 and 72, the thickness measuring unit 45 is moved to the right body 70 side which is the standby position. Then, as shown in FIG. 9B, with the tire T held by the left and right rim bodies 42 and 72, the ultrasound probe 59 is moved to the measurement preparatory position where the ultrasound probe 59 faces the one end side of the tread surface Ts. Then, as shown in FIG. 9C, both the tread surface Ts and the ultrasound probe 59 are immersed in the liquid 34 as the tank 31 is lifted.

It should be noted that when there is a change in the size of the tire T for the measurement of the tread thickness D, adjustments can be made by driving the vertical positioning mechanism 60 to create the same condition for the distance between the ultrasound probe 59 and the tread surface Ts.

The tire drying means 77, which is disposed at an upper end position on the tire entry side, is attached to a support member 78 which bridges between the left body 40 and the right body 70 at the top end thereof. The tire drying means 77 is, for example, an air nozzle that is provided with a discharge outlet that can raise the flow speed of the air supplied to the air nozzle. The air nozzle is attached to the support member in such a manner that the discharge outlet faces toward the tread surface Ts of the tire held by the tire holding unit 4. Connected to the air nozzle is a piping led from the air release valve 50, and the air discharged from the air release valve 50 is ejected toward the tread surface Ts.

The measurement control unit 100 is a computer for controlling the operation of the tread thickness measuring apparatus 1. The measurement control unit 100, which includes CPU as arithmetic processing means, ROM, RAM, and HDD as storage means, and interface as communication means, controls the operation of measurement of the tread thickness D according to the program stereo in the storage means. Also, the measurement control unit 100 is equipped with display means such as a monitor and input means such as a keyboard and a mouse.

Figure 10:
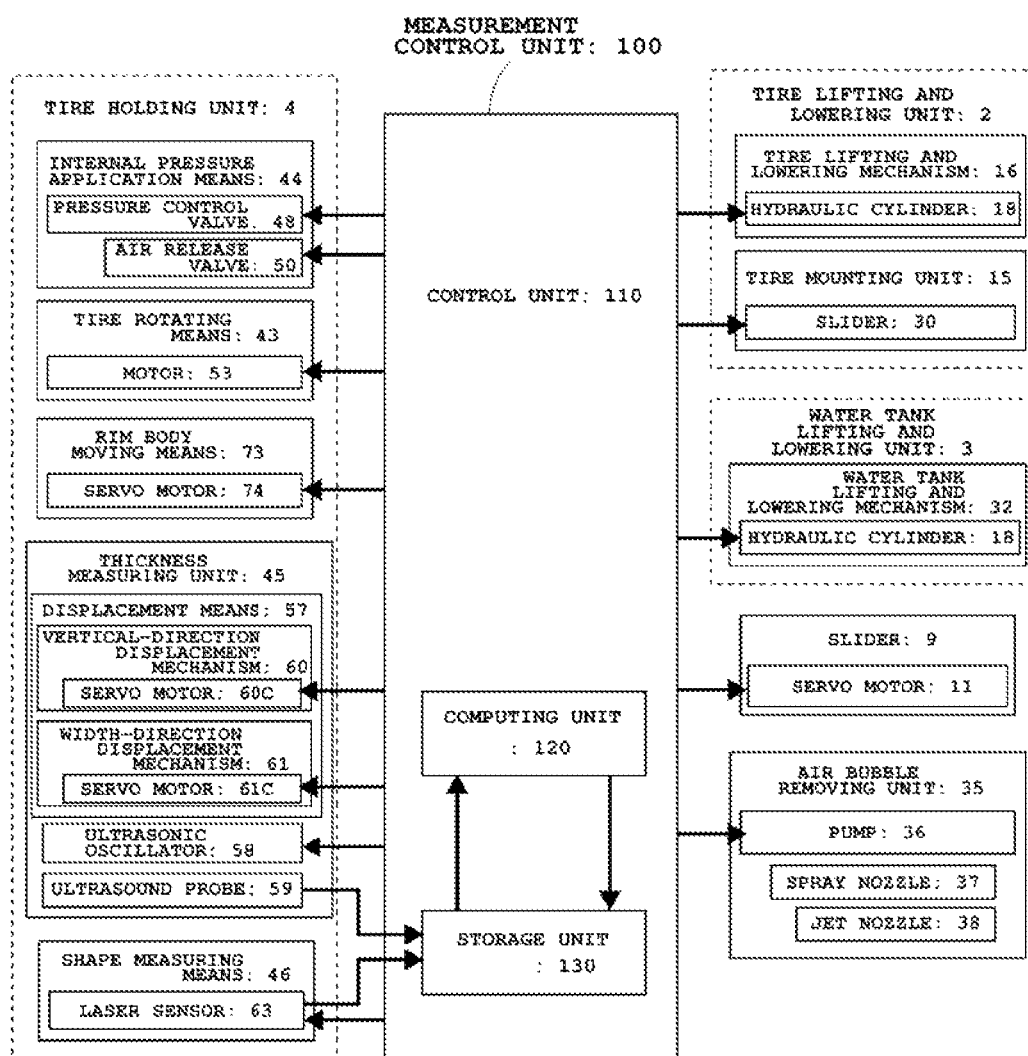
FIG. 10 is a block diagram showing control by a measurement control unit.

FIG. 10 is a control block diagram of a measurement control unit 100. Hereinbelow, a description is given of the control operation for the tread thickness measuring apparatus 1 by the measurement control unit 100.

The measurement control unit 100 includes a control unit 110, a computing unit 120, and a storage unit 130.

The control unit 110 controls the lifting and lowering of the tire T to and from the tire holding position by controlling the extension and retraction of the hydraulic cylinder 18 of the tire lifting and lowering mechanism 16 of the tire lifting and lowering unit 2 and also controls the movement of the slider 30 which controls the inclination of the tire mounting unit 15.

Also, the control unit 110 controls the lifting and lowering of the tank 32 by controlling the extension and retraction of the hydraulic cylinder 18 of the tank, lifting and lowering mechanism 32 of the tank lifting and lowering unit 3.

Also, the control unit 110 controls the drive of the pump 36 for the air bubble removing unit 35 installed in the tank 31 to control the spraying of misty liquid 34 from the spray nozzles 37 and the jet flow of the liquid 34 from the jet nozzle 33.

Also, the control unit 110 controls the positions of the tire lifting and lowering unit 2 and the tank lifting and lowering unit 3 by controlling the rotation of the servo motor 11 which is the drive source of the slider 9 for the movement of the tire lifting and lowering unit 2 and the tank lifting and lowering unit 3.

Also, the control unit 110 controls the holding and release of the tire T by bringing the right rim body 72 closer to or apart from the left rim body 42 by controlling the drive of the servo motor 74 for moving the moving member 76 of the rim body moving means 73, the application of internal pressure into the tire T held by the left and right rim bodies 42 and 72 by controlling the operation of the pressure control valve 48 of the internal pressure application means 44, the release of the internal pressure applied in the tire T by controlling the operation of the air release valve 50, and the rotation of the tire T by controlling the operation of the motor 53 of the tire rotating means 43.

Also, the control unit 110 controls the movement of the ultrasound probe 59 in the direction closer to and in the tire width direction relative to the tread surface Ts by controlling the servo motor 60C of the vertical-direction positioning mechanism 60 and the servo motor SIC of the width-direction positioning mechanism 61 of the positioning means 57 of the thickness measuring unit 45, and controls the measurement of the tread thickness D by controlling the emission operation of the ultrasonic oscillator 58 to enable the emission of ultrasonic waves from the ultrasound probe 59. Also, the control unit 110 outputs the waveform of the received reflected waves of the ultrasonic waves emitted from the ultrasound probe 59 and reflected by the tread surface Ts to the storage unit 130.

Also, the control unit 110 controls the operation for shape measurement by the laser sensor 63 of the shape measuring means 46 by controlling the servo motor 60C of the vertical-direction positioning mechanism 60 and the servo motor 61C of the width-direction positioning mechanism 61 of the positioning means 57 of the thickness measuring unit 45 and outputs the measured shape to the storage unit 130.

The computing unit 120 receives the reflected waves from the tread surface Ts and the belt surface 94a, respectively, of the ultrasonic waves emitted from the ultrasound probe 59, calculates the tread thicknesses B based on the respective reflected waves, and also calculates the position where the tread thickness D is the thickest and the position where the tread thickness D is the thinnest. Then the computing unit 120 outputs the calculated results to the storage unit and to the monitor for display.

The storage unit 130 stores the waveforms of the reflected waves at the respective ultrasonic measurement positions and the calculated tread thicknesses D.

Hereinbelow, a description is given of the steps of measuring the tread thickness D of the tire T by the tread thickness measuring apparatus 1 with reference to FIGS. 11 to 14.

Figure 11A:
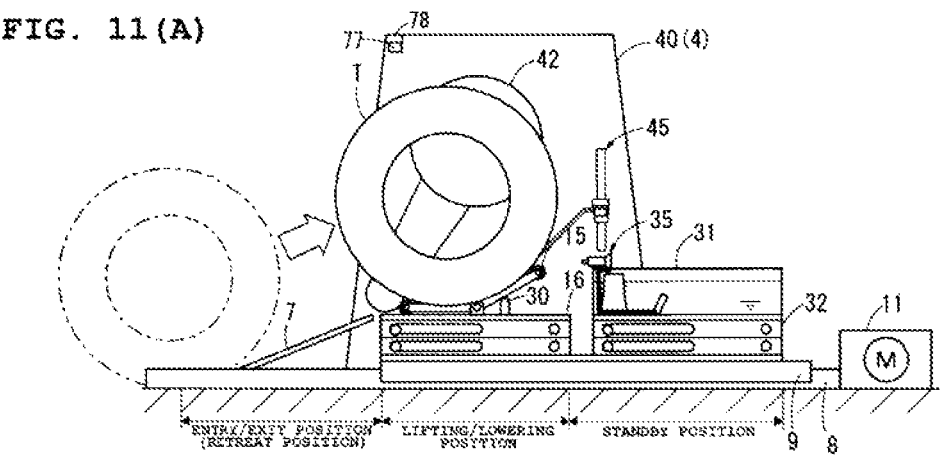
FIG. 11 is measurement process diagrams for the measurement of tread thickness.
Figure 11B:
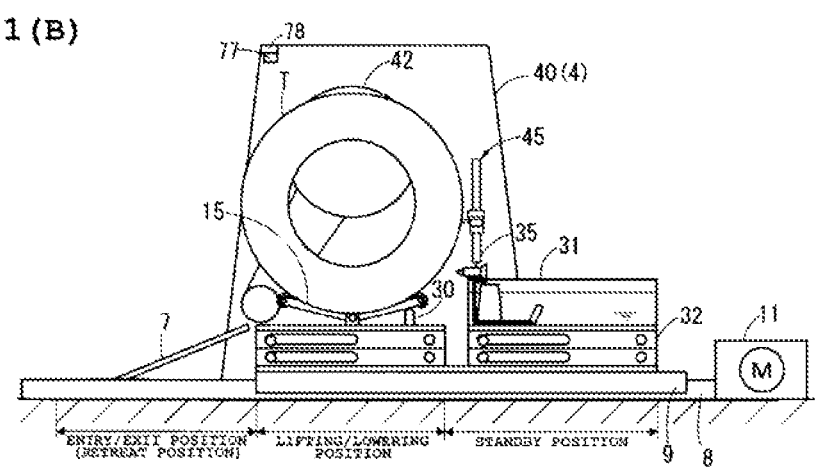
Figure 11C:
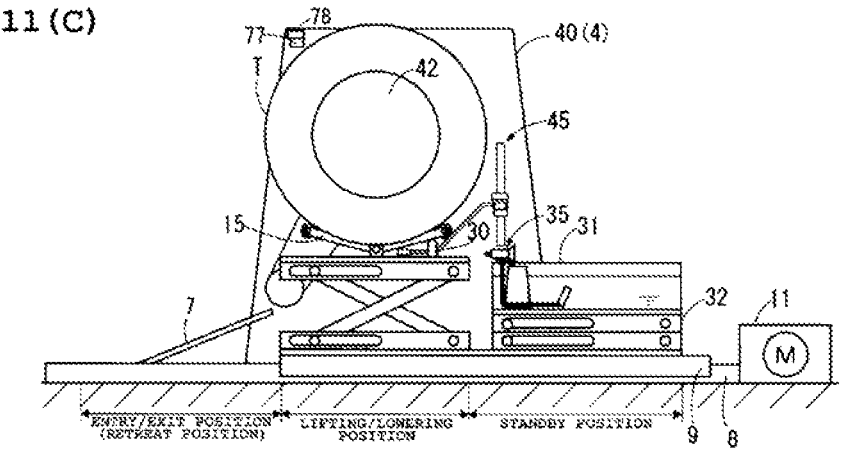

The measuring steps start with the holding of a tire T for tread thickness measurement by the tire holding unit of the tread thickness measuring apparatus 1. Firstly, as shown in FIG. 11A, the tire mounting unit 15 is inclined toward the tire entry side by moving the slider 30 of the tire lifting and lowering unit 2 in preparation for the carrying-in of the tire T by the worker. Then the worker rolls the tire T along the slope of the entry path and places it on the tire mounting unit 15. Next, as shown in FIG. 11B, the slider 30 is moved until the tire mounting unit 15 is made level so that the tire T stands on its own. Then, as shown in FIG. 11C, the tire mounting unit 15 is raised, by retracting the hydraulic cylinder 18 of the tire lifting and lowering mechanism 16, thereby moving the wheels 21A and 22A of the link members 21 and 22 along the elongate holes 19B and 20B. To be more specific, the fire T is lifted to a height where the center of the tire T is aligned with the axis of the left and right rim bodies 42 and 72.

Next, the moving member 76 is moved toward the left body 40 and thus the right rim body 72 is brought closer to the left rim body 42, thereby having the bead portions of the tire T come in close contact with one of the steps of the stepped peripheries 51 and 81 of the left and right rim bodies 42 and 72. Then the air is supplied into the tire T by operating the internal pressure application means 44 until the internal pressure reaches the specified service pressure for the tire. As a result, the tire T is held by the left and right rim bodies 42 and 72 in the service form.

Figure 12A:
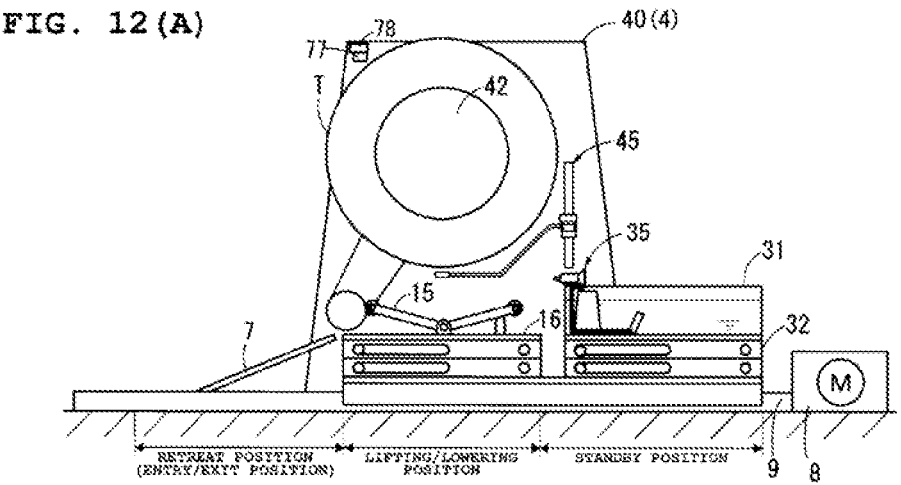
FIG. 12 is measurement process diagrams for the measurement of tread thickness.

Next, as shown in FIG. 12A, the tire mounting unit 15 is lowered to the lowest position by extending the hydraulic cylinder 18 of the fire lifting and lowering mechanism 16. Then the ultrasound, probe 53 is moved to the measurement start position by driving the vertical-direction positioning mechanism 60 and the width direction positioning mechanism 61 of the thickness measuring unit 45 (see FIG. 9B). In this position, the ultrasound probe 59 does not collide with the tire T even if it is moved in the tire width direction. Next, by driving the width-direction positioning mechanism 61 only, the laser sensor 63 of the shape measuring means 46 is moved in the tire width direction and the shape of the tread surface Ts is measured. After this, the slider 61C of the width-direction positioning mechanism 61 is returned to the standby position of the ultrasound probe 59. The profile measured by the laser sensor 63 is outputted to the measurement control unit 100, where the measuring range for the measurement of the tread thickness D by the ultrasonic measurement is set. More specifically, the width center of the tire T is detected from the profile measured, and the width center is set as the measurement origin for the ultrasonic measurement.

Figure 12B:
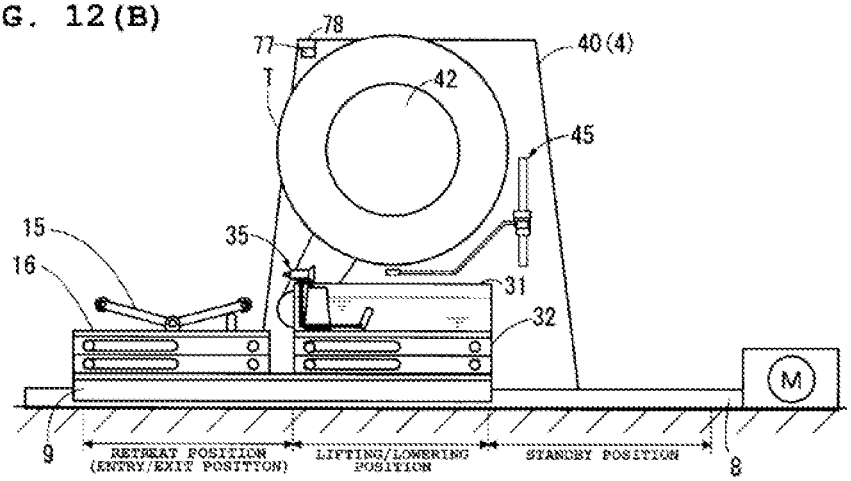
Figure 12C:
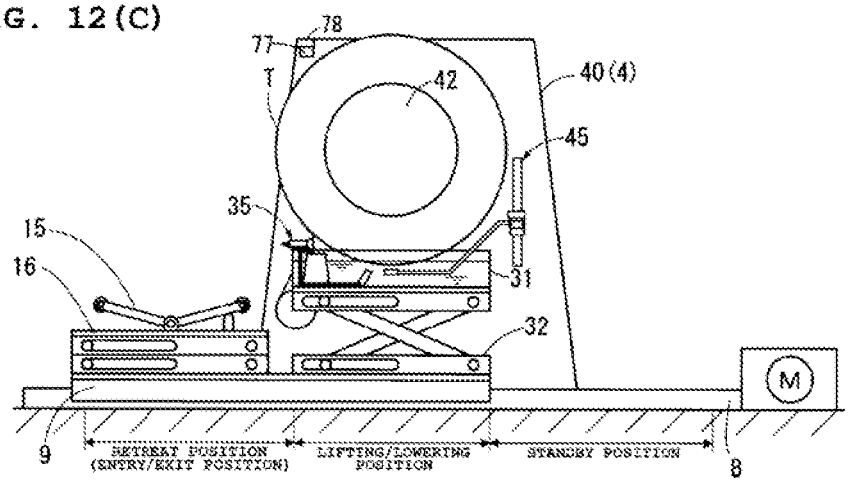

Next, after the slope 7 is lowered, as shown in FIG. 12B, the sliders 9 are moved to the tire entry side following the signal outputted to the servo motors 11 for moving the tire lifting and lowering unit 2 and the tank lifting and lowering unit 3. Upon this, the tank lifting and lowering unit 3 is moved to the same position as the lifting/lowering position of the tire lifting and lowering unit 2 when the tire T is held by the tire holding unit 4. That is, the sliders 9 are so moved as to replace the tire lifting and lowering unit 2 by the tank lifting and lowering unit 3. Then, as shown in FIG. 12C, the tank 31 is lifted by driving the hydraulic cylinder 18 of the tank lifting and lowering mechanism 32 of the tank lifting and lowering unit 3. As a result of this lifting operation, the tread surface Ts and the ultrasound probe 59 are immersed in the liquid 34.

Next, by driving the pump 36 of the air bubble removing unit 35, the liquid 34 pooled in the tank 31 is forced to the spray nozzles 37 and the jet nozzle 38 so that a misty liquid 34 is sprayed on the tread surface Ts before its entry in the liquid 34 and at the same time a let flow of the liquid 34 is ejected to the tread surface T already immersed in the liquid 34 in the tank 31 (see FIG. 6). As a result of the spraying of a misty liquid 34 on the tread surface Ts before its entry in the liquid 34 and also the ejection of a let flow of the liquid 34 to the tread surface T already immersed in the liquid 34 in the tank 31, the adhesion of air bubbles to the tread surface Ts is suppressed and a highly precise ultrasonic measurement becomes possible.

Next, the ultrasound probe 59 is moved from the measurement start position to the measurement end position in the tire width direction by driving the width-direction positioning mechanism 61, during which the tread thickness D is measured. In other words, the measuring range for ultrasonic measurement is set from the profile measured by the shape measuring means 46, and the measurement positions for ultrasonic measurement in the width direction are set from the measuring range. Then, at the measurement positions, ultrasonic waves are emitted, and the reflected waves received, as the ultrasound probe 59 is moved from the measurement start position to the measurement end position. The reflected waves at each of the measurement positions are outputted to the measurement control unit 100 via the ultrasonic measuring unit 58. At this time, the measurement control unit 100 stores the inputted reflected waves in association with their measurement positions.

Next, upon completion of measurement of the tread thicknesses D in the width direction for one circumferential position of the tire, the tire T is rotated by a predetermined angle, and the tread thicknesses D in the tire width direction for another circumferential position after a shift by the predetermined angle of the tire are measured by again moving the ultrasound probe 59 from the measurement start position to the measurement end position in the tire width direction. The above-described process is repeated for a full circle around the tire, and the measurement of the tread thicknesses D of the tire is completed.

Figure 13A:
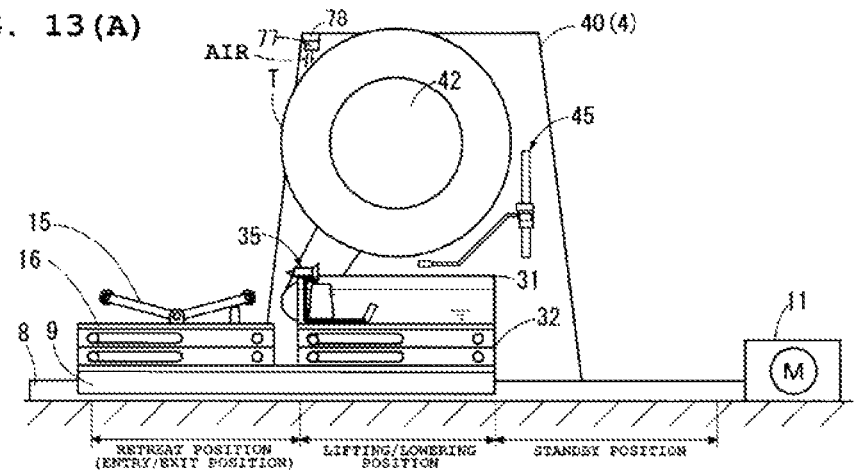
FIG. 13 is measurement process diagrams for the measurement of tread thickness.
Figure 13B:
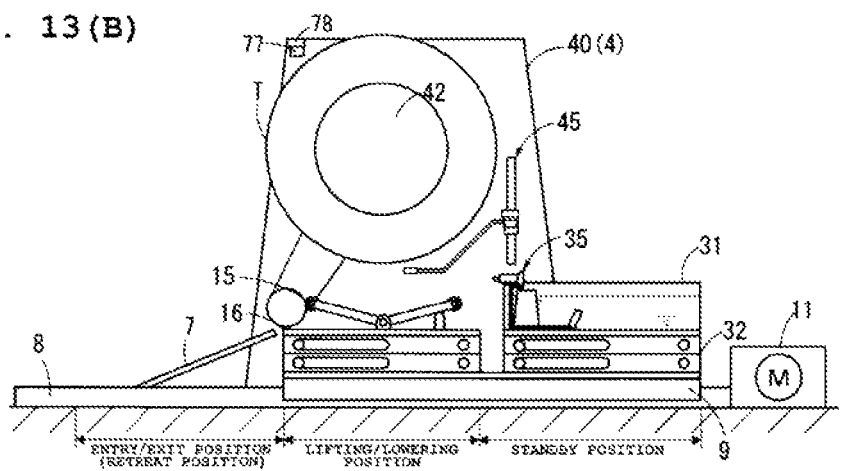
Figure 13C:
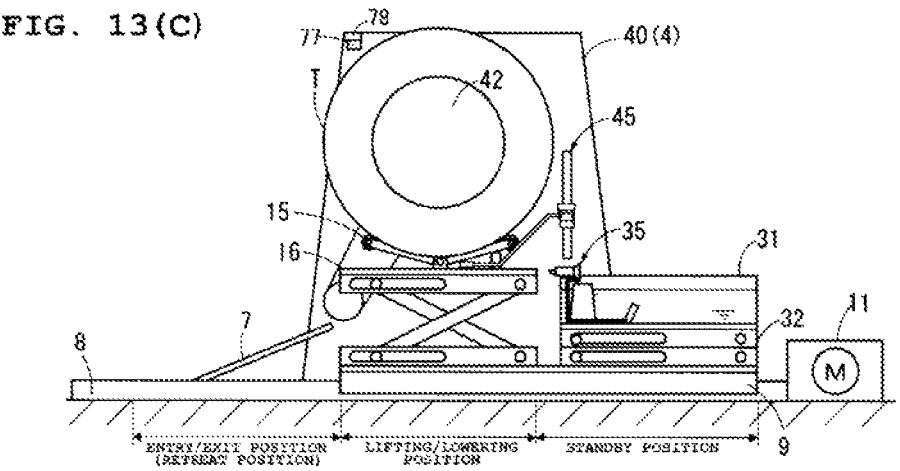

Next, upon completion of measurement of the tread thicknesses D for a full circle around the tire T, the spray of the liquid 34 from the spray nozzles 37 and the jet flow of the liquid 34 from the jet nozzle 37 are stopped by stopping the drive of the pump 36. Next, as shown in FIG. 13A, the tank 31 is lowered to the lowest position by driving the tank lifting and lowering mechanism 32 of the tank lifting and lowering unit 3, and then the ultrasound probe 53 is moved to the standby position. Then the air inside the tire T is released through the air nozzle of the tire drying means 77 by opening the air release valve 50 while the motor 53 of the tire rotating means 43 is rotated at a predetermined speed. And the air released through the air nozzle is directed at the tread surface Ts to dry it by blowing off the liquid 34 adhering thereto. Next, upon completion of drying of the tire surface Ts, as shown in FIG. 13B, the tank lifting and lowering unit 3, together with the sliders 9, is moved to the downstream side in the tire carry-in direction by driving the servomotors 11, thus replacing the tank lifting and lowering unit 3 by the tire lifting and lowering unit 2. That is, the tire lifting and lowering unit 2 is moved to the position where the tank lifting and lowering unit 3 has been in the measurement of the tread thickness D. Next, as shown in FIG. 13C, the tire mounting unit 15 is raised by driving the tire lifting and lowering mechanism 16 of the tire lifting and lowering unit 2, and after it has reached the lower surface of the tire, the air is released from within the tire and the right rim body 72 is moved away from the tire T.

Figure 14A:
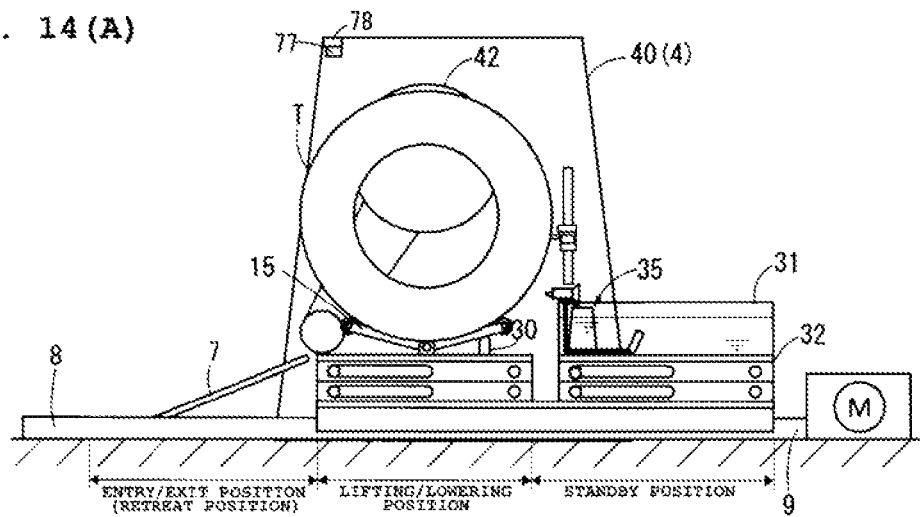
FIG. 14 is measurement process diagrams for the measurement of tread thickness.
Figure 14B:
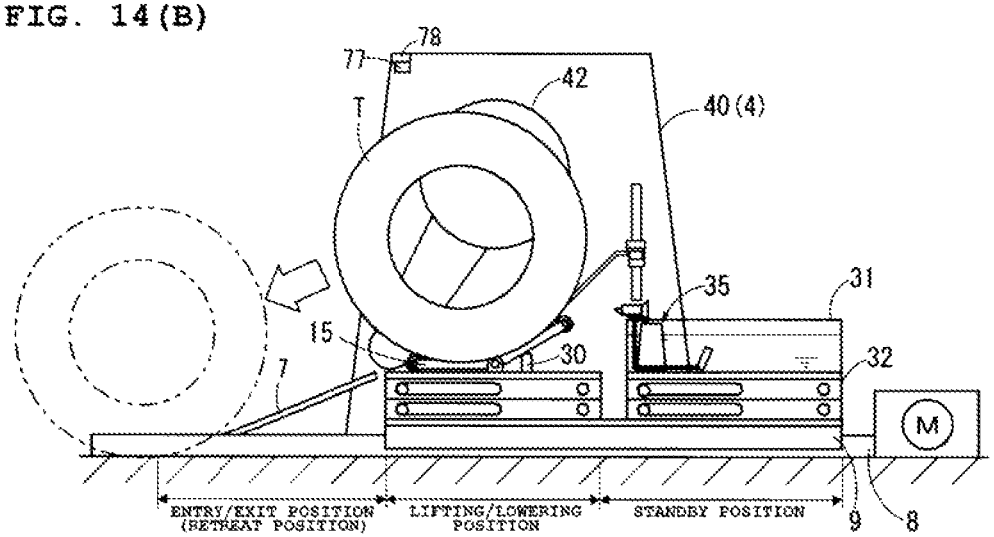

Next, as shown in FIG. 14A, the tire T, supported by the tire mounting unit 15, is lowered to the lowest position by driving the tire lifting and lowering mechanism 16. Then, as shown in FIG. 14B, the slider 30 is shifted to the tire entry side to incline the tire mounting unit 15 toward the tire entry side before the tire T is carried out.

Thus, as explained above, with the tread thickness measuring apparatus 1 according to the present invention, the liquid 34 pumped up by the pomp 36 is sprayed in a mist from the spray nozzles 37 on the tread surface Ts before its entry in the pooled liquid 34, and a jet flow of the liquid 34 is ejected from the jet nozzle 38 to the tread surface T already immersed in the pooled liquid 34, by driving the pump 36 provided within the tank 31. As a result, the ultrasonic measurement can be carried out without allowing the adhesion of air bubbles to the tread surface Ts. Hence, it is possible to accurately measure the tread thickness D from the tread surface Ts to the belt 94 located in a radially outermost position. Also, the tread thickness D from the tread surface Ts to the belt 94 located in a radially outermost position is measured using ultrasonic waves. Hence, it is possible to accurately measure the tread thickness D from the tread surface Ts to the outermost belt surface 94a irrespective of the type of material used for the belt 94 located in a radially outermost position.

Accordingly, the tread thickness D can be measured with the tread thickness measuring apparatus 1 of the present invention when a tire T is retreaded. By doing so, the amount of buffing can be set correctly without damaging the tire T no matter what type of material is used for the outermost belt 94. Note that the amount of buffing meant here is the thickness by which the tread is abraded to leave a necessary thickness from the outermost belt 94.

Although the invention has been described by way of an example of a preferred embodiment, the technical scope of the invention should not be considered as limiting. Rather, it is to be understood that various modifications or improvements may be made within the spirit of the invention.

DESCRIPTION OF REFERENCE NUMERALS 2 tire lifting and lowering unit
3 tank lifting and lowering unit
4 tire holding unit
8 rail
9 slider
15 tire mounting unit
16 tire lifting and lowering mechanism
31 tank
32 tank lifting and lowering mechanism
35 air bubble removing unit
36 pump
37 spray nozzle
38 jet nozzle
42, 72 rim body
43 tire rotating means
44 internal pressure application means
45 thickness measuring unit
46 shape measuring means
58 ultrasonic oscillator
53 ultrasound probe
94 belt
94a belt surface
100 measurement control unit
T tire
Ts tread surface

The invention claimed is:

1. A tread thickness measuring method comprising the steps of:
spraying a liquid on a tread surface;
immersing the sprayed tread surface in the same liquid pooled in a tank;
measuring a sectional shape of the tread surface in a tire width;
setting a measuring range from the sectional shape;
setting a measuring position from the measuring range;
measuring a depth of a belt located in an outermost position in the tire at the measuring position by emitting ultrasonic waves to the tread surface immersed in the liquid in the tank and receiving reflected waves thereof.

2. The tread thickness measuring method of claim 1, further comprising the step of ejecting a jet flow of the liquid pooled in the tank at the tread surface immersed therein before measuring the depth of the belt.

3. The tread thickness measuring method of claim 1, wherein the sectional shape of the tread surface in the tire width is measured by moving a laser between one tire side and another other tire side while the laser beam is applied onto the tread surface.

4. The tread thickness measuring method of claim 2, wherein the sectional shape of the tread surface in the tire width is measured by moving a laser between one tire side and another other tire side while the laser beam is applied onto the tread surface.

* * * * *